United States Patent [19]

Barrett

[11] Patent Number: 5,768,112

[45] Date of Patent: Jun. 16, 1998

[54] SUB-RESONANT SERIES RESONANT CONVERTER HAVING IMPROVED FORM FACTOR AND REDUCED EMI

[75] Inventor: Alfred Henry Barrett, Carmel, Ind.

[73] Assignee: Delco Electronics Corp., Kokomo, Ind.

[21] Appl. No.: 866,794

[22] Filed: May 30, 1997

[51] Int. Cl.$^6$ ............................... H02M 3/335
[52] U.S. Cl. ............... 363/16; 363/17; 363/132
[58] Field of Search ................... 363/16, 17, 98, 363/132, 95, 97, 131

[56] References Cited

U.S. PATENT DOCUMENTS

| | | | |
|---|---|---|---|
| 4,679,129 | 7/1987 | Sakakibara et al. | 363/17 |
| 5,504,668 | 4/1996 | Beyerlein et al. | 363/95 |
| 5,587,892 | 12/1996 | Barrett | 363/16 X |
| 5,684,678 | 11/1997 | Barrett | 363/17 |

Primary Examiner—Peter S. Wong
Assistant Examiner—Y. J. Han
Attorney, Agent, or Firm—Jimmy L. Funke

[57] ABSTRACT

An improved sub-resonant converter which retains the advantages generally associated with simple series resonant converters while additionally providing improved form factor and efficiency, and reducing EMI. The overall tank circuit includes at least a first inductor and first capacitor connected in series, a second capacitor connected in parallel with the load circuit, and a second inductor connected in parallel with the second capacitor for providing voltage boost capability. In addition to reducing dv/dt in the load circuit, the second capacitor draws a current that has the effect of reducing the form factor of the supplied current while shortening the negative portion of its cycle so that reverse current through the anti-parallel diode of one switching device is terminated, or nearly so, by the turn on of the next switching device, thereby reducing EMI associated with a rapid initial rise in current at such turn on. In a preferred embodiment, the tank circuit also includes a third inductor connected in parallel with the first capacitor to narrow the switching frequency range, thereby extending the above-described form factor and EMI improvements over the entire load range of the converter. In addition, the tank circuit is preferably coupled to the load circuit via an isolation transformer.

10 Claims, 12 Drawing Sheets

FIG - 11

| NUMBER OF ELEMENTS | 4 | 5 | 5 | 5 | EXAMPLE 5 | |
|---|---|---|---|---|---|---|
| Fo(max)/Fo(min) | >1000 | 2.00 | 1.50 | 1.20 | 1.20 | |
| Vin/Vout | 1.00 | 1.00 | 1.00 | 1.00 | various/100 | |
| Rload (effective) | R | R | R | R | 30 ohms | |
| Frequency maximum output | Fo(max) | Fo(max) | Fo(max) | Fo(max) | 150 kHz | |
| Frequency of lowest zero | 0 | 0.50Fo(max) | 0.67Fo(max) | 0.83Fo(max) | 125 kHz | |
| Frequency dominant pole (min) | 0.78Fo(max) | 0.83Fo(max) | 0.86Fo(max) | 0.93Fo(max) | 139 kHz | |
| Frequency dominant pole (max) | 1.83Fo(max) | 1.66Fo(max) | 1.51Fo(max) | 1.33Fo(max) | 200 kHz | |
| Frequency of load zero | 2.00Fo(max) | 2.00Fo(max) | 2.00Fo(max) | 2.00Fo(max) | 300 kHz | |
| | | | | | | Values |
| C1 impedance at Fo(max) | 1.046R | 0.787R | 0.578R | 0.354R | 10.62 ohms | (0.10 uF) |
| C2 impedance at Fo(max) | 4.717R | 4.717R | 4.717R | 4.717R | 141.51 ohms | (0.0075 uF) |
| L1 impedance at Fo(max) | not used | 3.135R | 1.372R | 0.533R | 15.99 ohms | (17 uH) |
| L2 impedance at Fo(max) | 0.314R | 0.314R | 0.314R | 0.314R | 9.42 ohms | (10 uH) |
| L3 impedance at Fo(max) | 1.193R | 1.193R | 1.193R | 1.193R | 35.79 ohms | (38 uH) |

1

SUB-RESONANT SERIES RESONANT CONVERTER HAVING IMPROVED FORM FACTOR AND REDUCED EMI

This invention relates to a sub-resonant series resonant converter (that is, a series resonant converter operated at switching frequencies below the resonant frequency of the converter), and more particularly to a converter having a load coupled tank element that reduces electromagnetic interference (EMI) and improves efficiency.

BACKGROUND OF THE INVENTION

A resonant converter can be generally defined as a converter in which a DC or rectified AC source is switched across the series and/or parallel combination of two or more reactive elements (a tank circuit) and an output coupling circuit, where the switching frequency can be varied to control the output power.

Two parameters considered in the design of a converter circuit are electro-magnetic interference (EMI) and the form factor of the conducted current, as it affects efficiency. EMI is primarily produced by sharply rising or falling current in the tank or output circuits, and is to be minimized if possible to avoid undesired interference with receivers and other electronic devices. Form factor, defined as the ratio of the root-mean-square or rms value to the average value of a current waveform, is used to qualitatively assess conduction losses in the converter. A pure sine wave of current, which has a form factor of 1.11, is considered to be ideal from an efficiency standpoint.

The simplest of resonant converter topologies is a two-element series converter in which the tank circuit comprises the series combination of a capacitor and an inductor. This topology, depicted in FIG. 1, is advantageous for its high efficiency, soft-switching and effective usage of high power switching devices such as insulated gate bipolar transistors (IGBTs) at higher operating frequencies than are possible with hard-switched PWM. The term "soft-switching" is often applied to circuits that operate with zero-voltage or zero-current switching, as explained below.

Referring specifically to FIG. 1, the series connected tank elements C1 and L2 are connected across a source of DC power via input EMI filter, by-pass capacitors C4 and C5, and high power IGBTs Q1 and Q2. The tank circuit has a single resonant pole at a frequency where the impedance of capacitor C1 equals that of inductor L2. The IGBTs Q1 and Q2 are alternately biased on and off at a controlled switching frequency to excite the tank circuit with alternating current. The transformer T1 inductively couples the tank circuit to a DC load via full-wave bridge rectifier CR2, by-pass capacitor C6, and an output EMI filter. In the illustrated embodiment, the by-pass capacitors C4, C5 and C6 are at least an order of magnitude lower in impedance than the tank capacitor C1, assuming that transformer T1 has a turns ratio of 1:1, and thus do not have a significant impact on the performance of the converter.

When the converter of FIG. 1 is operated at switching frequencies above the resonant pole—i.e., at super-resonant frequencies—the load current decreases monotonically with increasing frequency. Although each IGBT interrupts a large forward current at turn-off, there is no forward voltage across the IGBTs at turn on. Thus, the super-resonant mode of operation achieves what is generally referred to as zero-voltage switching. While the super-resonant mode is generally suitable for use with power MOSFETs which turn off quickly with little switching loss, it tends to produce EMI and is not feasible for use with slower turn-off devices such as IGBTs at operating frequencies very much above audibility (i.e., 20 kHz).

When the converter is operated at switching frequencies below the resonant pole—i.e., at sub-resonant frequencies—the load current decreases monotonically with decreasing frequency. In this mode, the current through a conducting IGBT reverses through an anti-parallel or free-wheeling diode prior to turn off so that the forward current through that IGBT is fully commutated before the other IGBT is allowed to turn-on. Thus, the sub-resonant mode of operation achieves what is generally referred to as zero-current switching. This mode, originally used with SCRs, is highly satisfactory for use with modern power devices which are slower than MOSFETs, such as IGBTs.

Regardless of the converter mode, operation at or close to the resonant pole is generally avoided since output control sensitivity is generally too high close to resonance and operation at resonance can produce runaway into heavy loads. Moreover, operation too close to resonance becomes a problem for slow devices such as IGBTs where turn-off recovery time may be inadequate. However, an advantage of operation close to resonance is that a form factor close to that of a sine wave can be achieved, thus reducing conduction losses.

As indicated above, the present invention is exclusively directed to converters operated at sub-resonant switching frequencies. Hence, the following discussion will be restricted to sub-resonant converter topologies, and various design modifications that have been proposed to improve performance or add functionality.

FIG. 2 depicts a converter with the addition of a third tank element, the inductor L3, connected in parallel with the primary winding of transformer T1. The additional inductor L3 provides boost capability, allowing the converter to produce an output voltage higher than its input voltage. Additionally, the inductor L3 operates to shift the dominant resonant pole lower in frequency when the load is lightened or open. In the extreme case of an open load, the resonant pole is produced by the series combination of capacitor C1, inductor L2 and inductor L3. At the other extreme (short circuit loading), the pole is determined by the series combination of capacitor C1 and inductor L2, as in the converter of FIG. 1.

FIG. 3 shows the power transfer characteristics of the two-element resonant converter of FIG. 1 compared with the three-element resonant converter of FIG. 2. Specific component values have been adjusted so that both converters being compared have approximately the same power output capability. The value of inductor L3 in FIG. 2 was chosen to provide close to optimum boost for the highest power factor in an AC input implementation. Further, both converters are operated at a switching frequency which does not exceed about 60% of the dominant resonant pole. Limiting the operating frequency this way ensures zero-current soft switching and satisfactory operation into a wide range of load voltage. A disadvantage is the somewhat higher than optimum form factor of the conducted currents, especially in the power switching devices. The performance is compared at four different operating frequencies; the highest is 150 kHz and the lowest is 10 kHz. The control is monotonic throughout the full operating range. The converter of FIG. 2 has the disadvantages generally associated with operation over a wide frequency range—difficult transformer design, audible noise, and the requirement for large input and output filters. Also, although FIG. 3 displays no control anomalies, most physical implementations are not fully monotonic. This tends to result from saturation of the core of transformer T1 at low operating frequencies.

The converters of FIG. 1 and 2 share the advantages of low switching losses, low di/dt across the switching devices, and hence, low electromagnetic interference (EMI). However, these circuits produce high dv/dt across transformer T1. Those skilled in the art will recognize that both differential and common mode dv/dt can be reduced, perhaps most effectively, by placing small capacitors connected from each terminal of the transformer secondary winding to ground. Alternatively, the addition of a small capacitor across the primary and/or secondary of transformer T1 can reduce this dv/dt without significantly affecting circuit behavior otherwise.

FIG. 4 shows a four-element resonant circuit which additionally includes an inductor L1 connected in parallel with tank capacitor C1. Similar topologies have been proposed by Sakakibara et al. in U.S. Pat. No. 4,679,129, and more recently, by Beyerlein et al. in U.S. Pat. No. 5,504,668. The parallel combination of inductor L1 and capacitor C1 places a load independent, and otherwise immovable, zero in the power transfer function of the tank circuit. In the sub-resonant mode of operation, the frequency of this zero precisely determines a minimum operating frequency at which the converter output is reduced to zero. Sakakibara et al. use the parallel tank to place the zero at or just above 20 kHz, to eliminate audible noise.

FIG. 5 illustrates two other topology variations known in the prior art concerning the source voltage and the switching transistor configuration. In regard to the source voltage, the converters of FIGS. 1, 2 and 4 are depicted as being powered by a DC source, whereas the converter of FIG. 5 is powered by an AC source, and thus includes an input full-wave bridge rectifier circuit CR1. With a suitable choice of value for the inductor L3, the AC input circuits exhibit a high power factor, above 0.98, with no active harmonic control. Additionally, it has been demonstrated that, with active control of the operating frequency, the power factor can be even higher, above 0.99, and over an extended range. In regard to the switching transistor configuration, the converters of FIGS. 1, 2 and 4 employ what is generally referred to as a half-wave bridge circuit in which a pair of transistors are alternately biased conductive, and the tank current is coupled to the to the source through a pair of by-pass capacitors C4 and C5. Alternately, as shown in FIG. 5, the converter may utilize a full-wave transistor bridge (IGBTs Q1–Q4) with one by-pass capacitor (C5). In general, the full-wave transistor bridge mechanizations are operated analogously to the half-wave mechanizations described above in reference to FIGS. 1, 2 and 4, except that the bridge transistors Q1/Q4 and Q2/Q3 are biased on and off in pairs.

SUMMARY OF THE PRESENT INVENTION

The present invention is directed to an improved sub-resonant converter which retains the advantages generally associated with simple series resonant converters while additionally providing improved form factor and reducing EMI. According to this invention, the overall tank circuit includes at least a first inductor and first capacitor connected in series, a second capacitor connected in parallel with the load circuit, and a second inductor connected in parallel with the second capacitor for providing voltage boost capability. In addition to reducing dv/dt in the load circuit, the second capacitor draws a current that has the effect of reducing the form factor of the supplied current while shortening the negative portion of its cycle so that reverse current through the anti-parallel diode of one switching device is terminated, or nearly so, by the turn on of the next switching device, thereby reducing EMI associated with a rapid initial rise in current at such turn on.

In a preferred embodiment, the tank circuit also includes a third inductor connected in parallel with the first capacitor to narrow the switching frequency range, thereby extending the above-described form factor and EMI improvements over the entire load range of the converter. In addition, the tank circuit is preferably coupled to the load circuit via an isolation transformer as discussed above in reference to FIGS. 1, 2 and 4.

BRIEF DESCRIPTION OF THE DRAWINGS

FIG. 11 is a table depicting the frequency breakpoints and the relative component values used in a four-element converter, FIG. 7 with the inductor L1 removed, and in the five-element converter of FIG. 7.

DETAILED DESCRIPTION OF THE DRAWINGS

Figure 6:
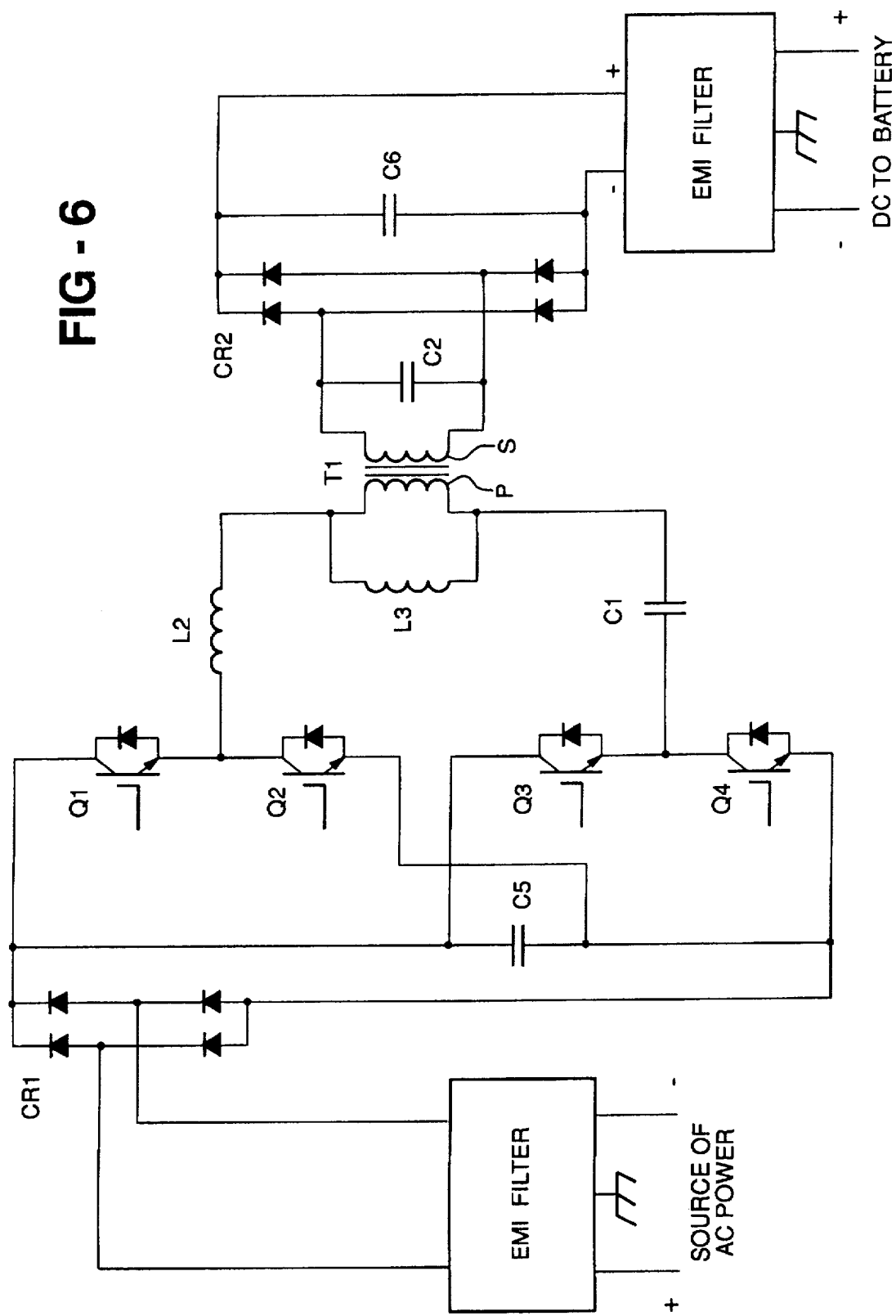
FIG. 6 is a circuit diagram of a four-element resonant converter circuit according to this invention, including a tank inductor and tank capacitor connected in series, a load-coupled capacitor connected in parallel with the load circuit, a boost inductor connected in parallel with the load-coupled capacitor and an isolation transformer coupling the tank circuit to the load circuit.
Figure 7:
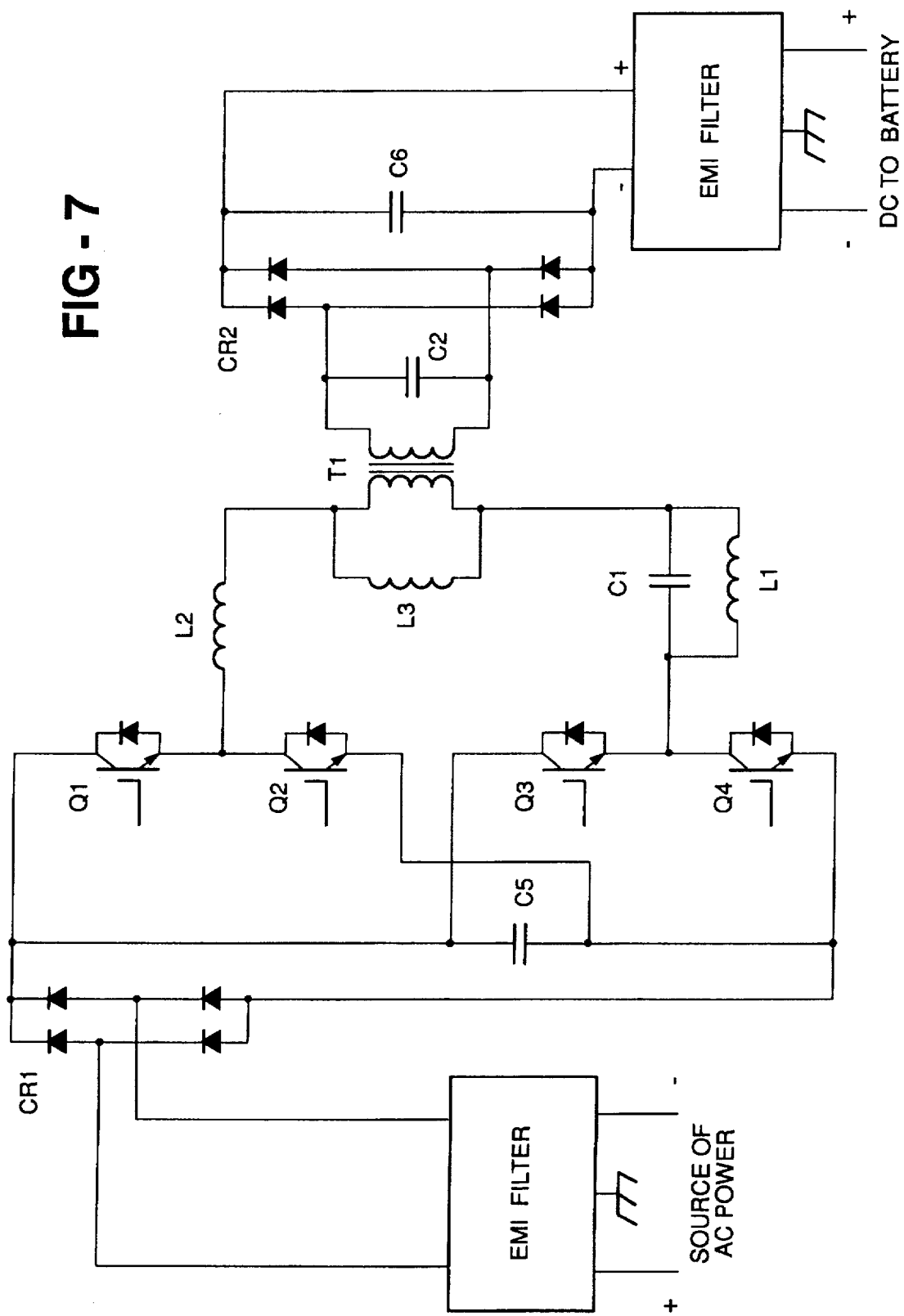
FIG. 7 is circuit diagram of a five-element resonant converter circuit according to this invention as depicted in FIG. 6, further including an inductor connected in parallel with the tank capacitor.
Figure 8:
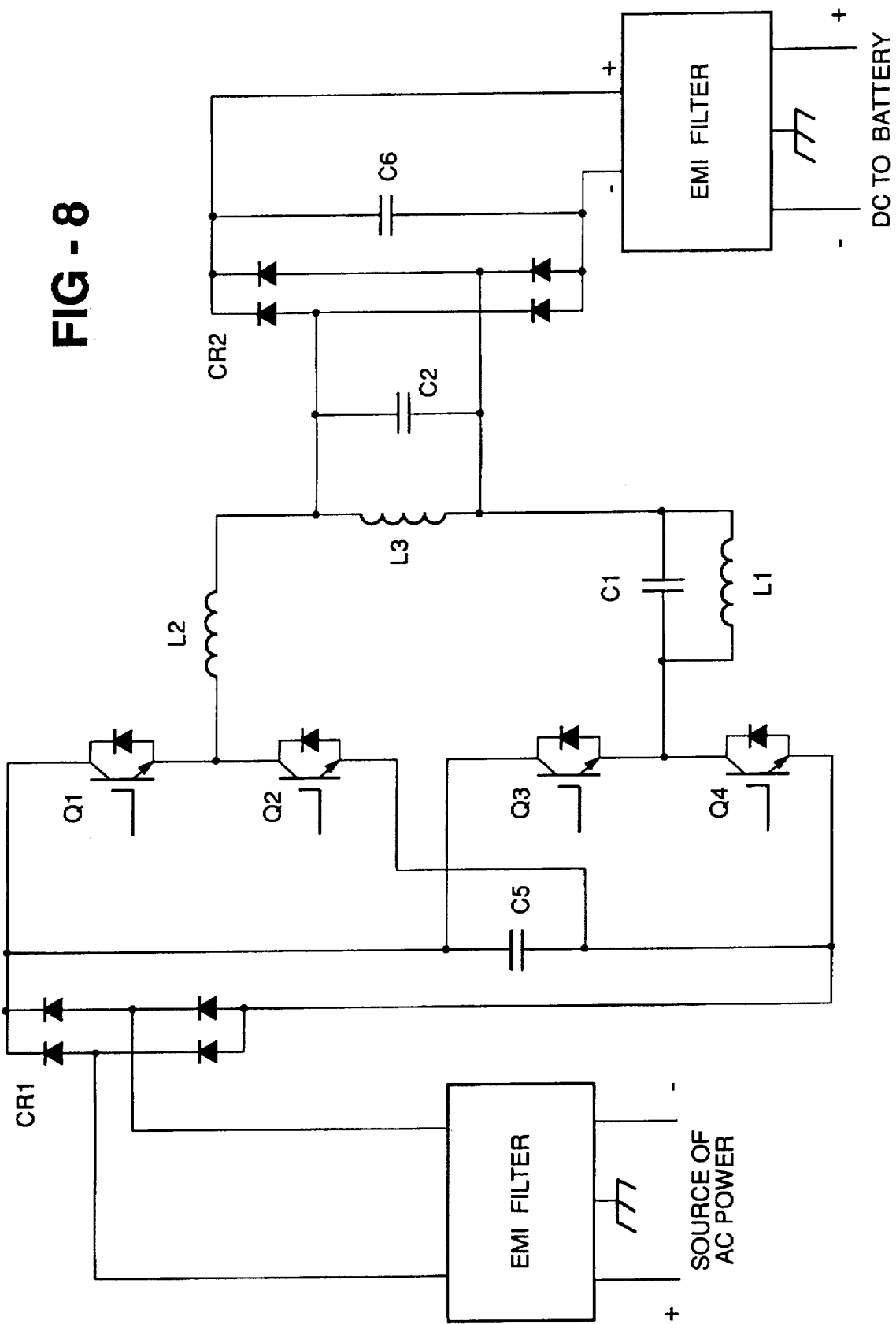
FIG. 8 is a circuit diagram of a four-element series-parallel resonant circuit according to this invention as depicted in FIG. 6, but with a directly coupled load circuit.

FIGS. 6–8 depict converter circuits according to this invention in a non-exhaustive illustration of different mechanizations. While each of the mechanizations is illustrated as being powered by an AC source and utilizing a full-wave IGBT bridge, other mechanizations powered by a DC source, and/or utilizing a half-wave bridge or switching devices other than IGBTs are also possible. Full-wave bridges are generally preferred over half-wave bridges for their increased efficiency and flexibility. As to the bridge transistors, IGBTs are generally preferred for input voltages above 200 volts, whereas MOSFETs are generally preferred for lower input voltages. In the DC mechanizations, C4 and C5 typically have a value of ten to fifty times that of C1. The same typical ratio of values is true in the AC mechanizations; accordingly, the voltage at the output of the full-wave bridge rectifier CR1 is a full-wave rectified sine wave. In full-bridge mechanizations, the outputs of one half-bridge may be phase-shifted relative to the other, but in the preferred embodiment, the second half-bridge operates with a fixed phase shift of 180 degrees.

A further circuit variation is the use of an isolation transformer coupling the tank circuit to the load circuit. The converter circuits of FIGS. 6–7 include an isolation transformer T1, while in the converter circuit of FIG. 8, the tank circuit is directly coupled to the load circuit. Each of the converter circuits can be utilized either with or without an isolation transformer, depending on system requirements.

In the output circuit, the rectifier CR2 provides full-wave rectification of the load current. Various other circuit configurations, such as center-tapped and voltage multiplier circuits, are also feasible. The capacitor C6, like capacitors C4 and C5, has a bypass function. Therefore, the capacitance of C6 is typically ten to fifty times greater than that of capacitor C1. This assumes that transformer T1 has a turns ratio of 1:1 or does not exist. Otherwise, if one assumes that transformer T1 has a turns ratio of 1:n, then the capacitance of C6 is typically ten to fifty times $C1/(n^2)$.

Figure 1:
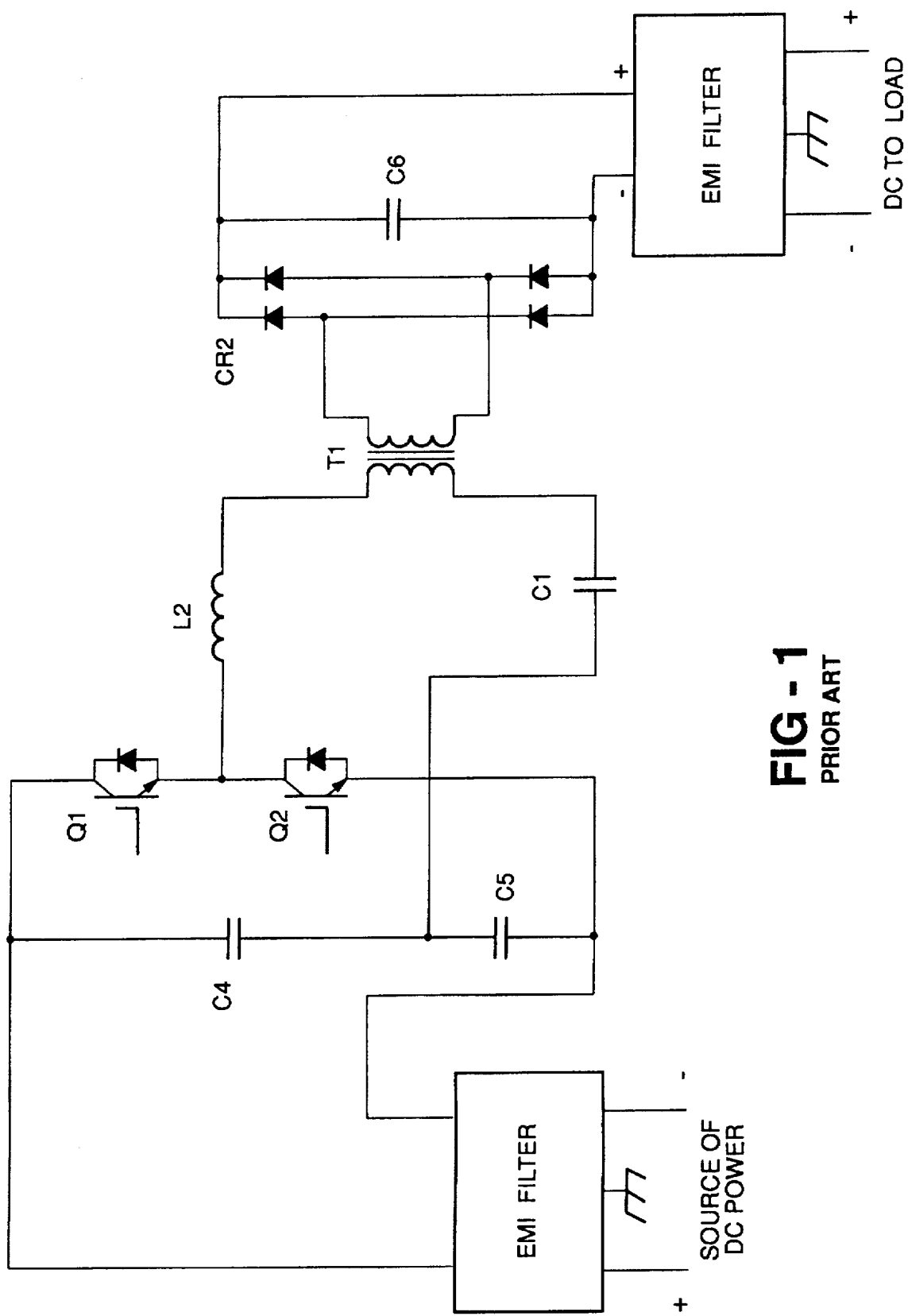
FIG. 1 is a circuit diagram of a prior art two-element series resonant converter circuit having a first tank capacitor, a first tank inductor, and an output transformer for coupling tank current to a DC load. The converter is powered by a DC source and utilizes a half-wave transistor bridge circuit.
Figure 2:
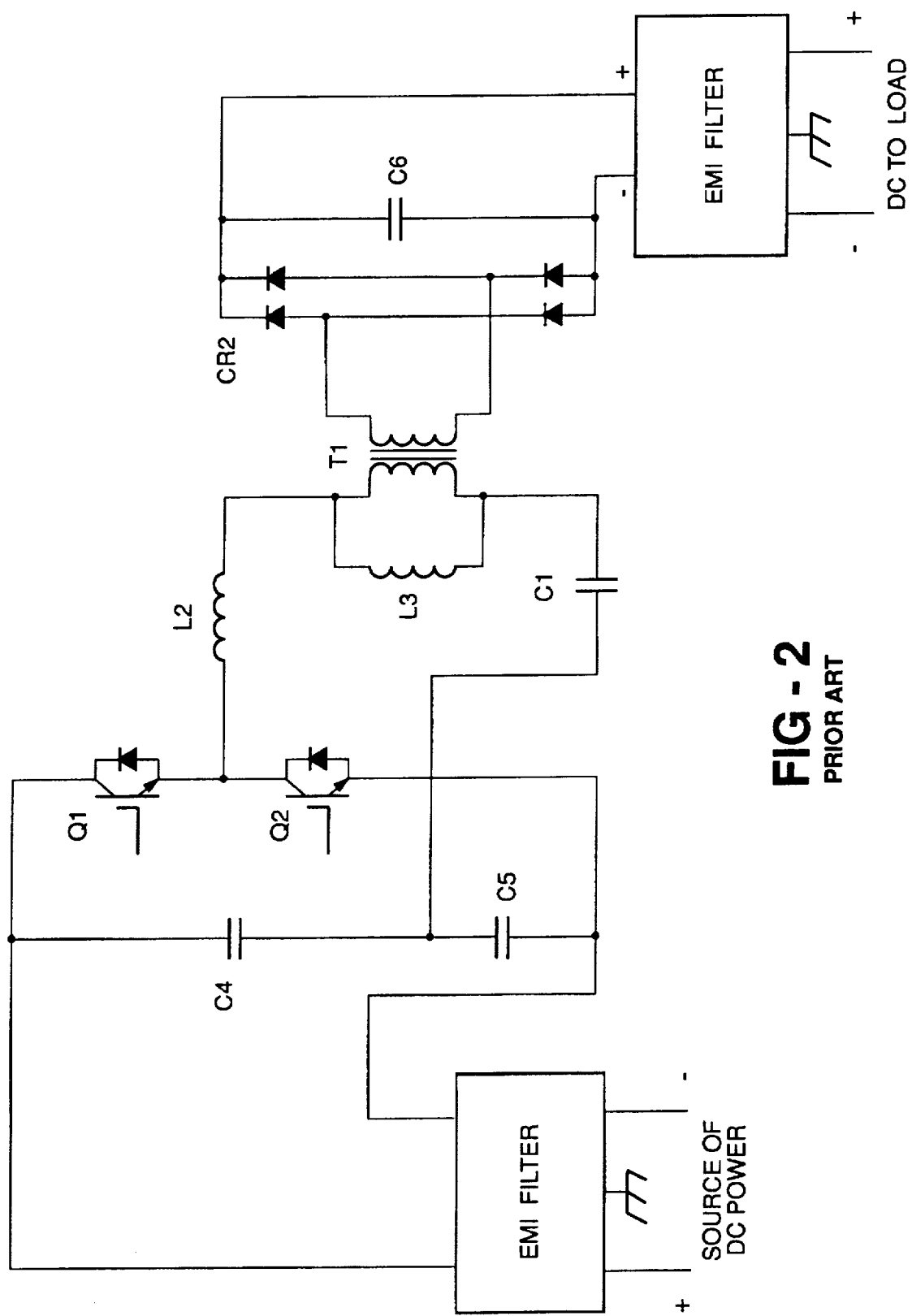
FIG. 2 is a circuit diagram of a prior art three-element resonant circuit as in FIG. 1, with the addition of a second tank inductor connected in parallel with the primary winding of the output transformer.
Figure 3:
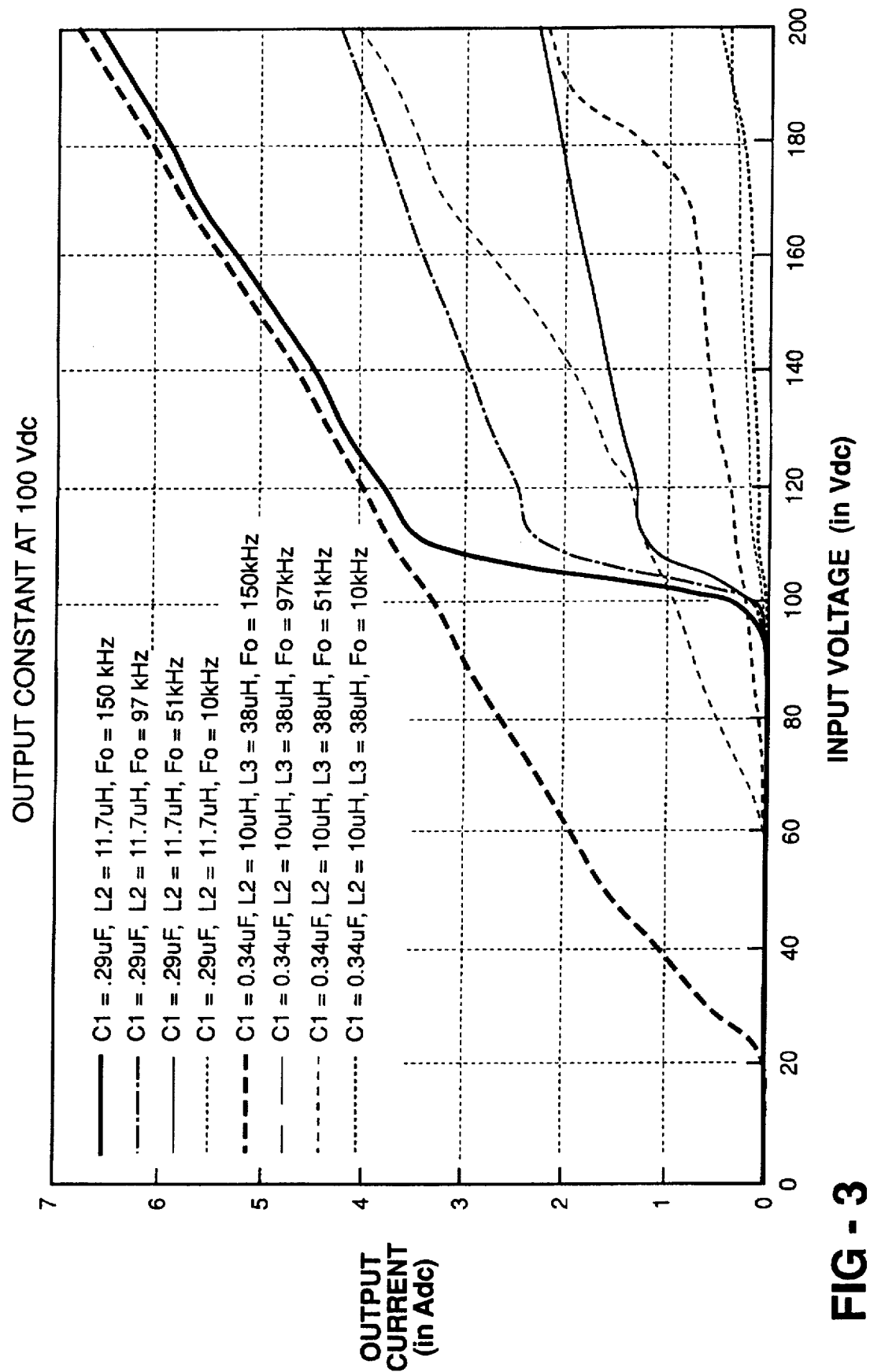
FIG. 3 is a graph depicting DC load current as a function of input voltage for the converter circuits of FIGS. 1 and 2 at four different operating frequencies.

Apart from the use of an isolation transformer, the simplest converter mechanization is depicted in FIG. 6, where the converter tank circuit includes four elements: a load-coupled capacitor C2 connected in parallel with the bridge rectifier CR2 of the load circuit, a boost inductor L3 connected in parallel with capacitor C2, and a tank inductor L2 and tank capacitor C1 connected in series with load-coupled capacitor C2. When an isolation transformer T1 is used, its secondary winding S is connected in parallel with capacitor C2 and its primary winding P is connected in parallel with boost inductor L3. In transformer-less mechanizations, the boost inductor L3 is connected directly in parallel with load-coupled capacitor C2, as shown in FIG. 8. As described above in reference to FIG. 2, the inductor L3 provides voltage boost capability.

Figure 4:
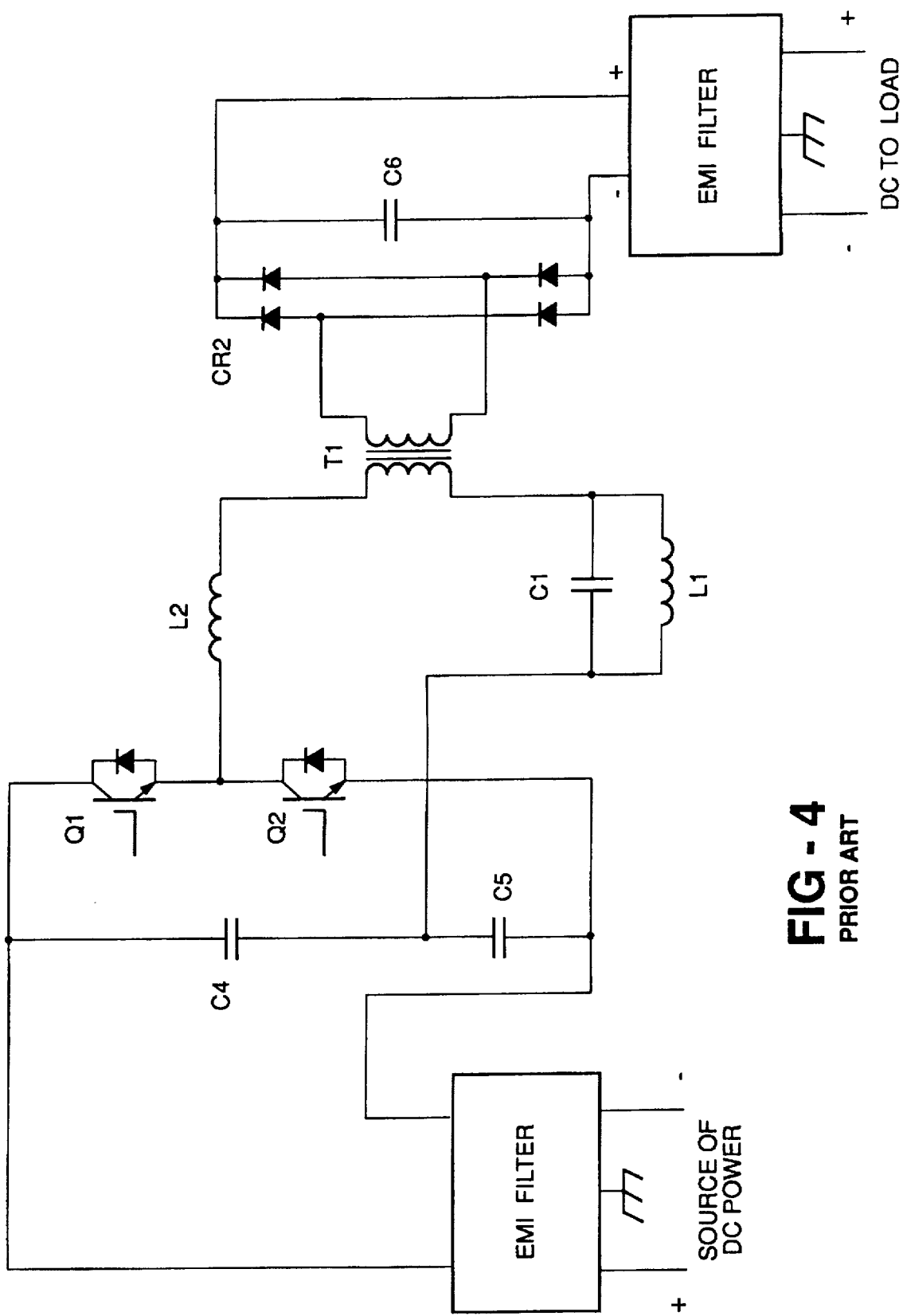
FIG. 4 is a circuit diagram of a prior art four-element resonant circuit as in FIG. 1, with the addition of a third tank inductor connected in parallel with the first tank capacitor.
Figure 5:
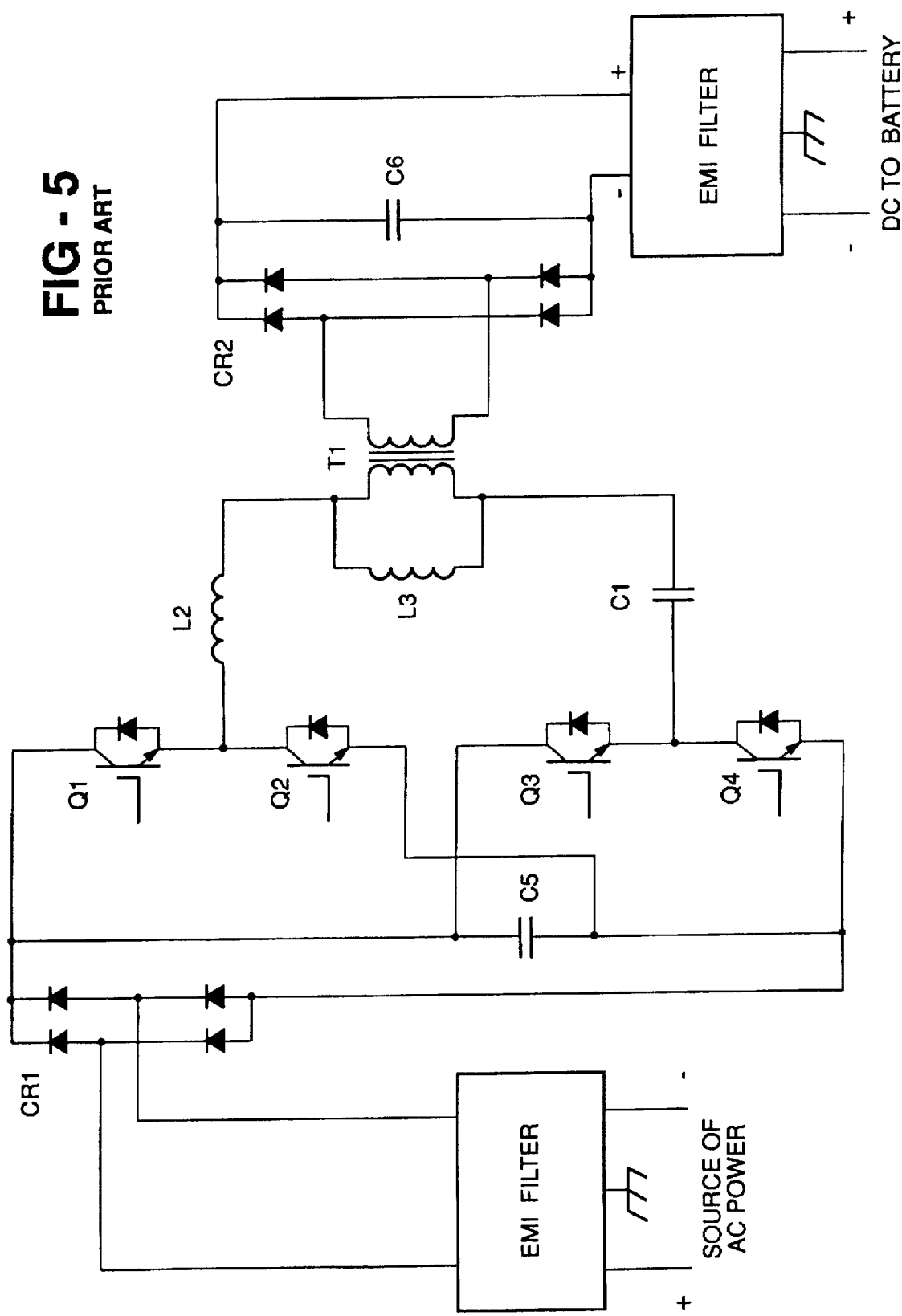
FIG. 5 is a circuit diagram of a prior art three-element series resonant circuit as depicted in FIG. 1, but powered by an AC source and utilizing a full-wave transistor bridge circuit.

A five element mechanization is depicted in FIG. 7, where the tank circuit additionally includes an inductor L1 connected in parallel with the capacitor C1. As discussed above in reference to FIG. 4, this introduces a load independent zero in the transfer function of the tank circuit. In effect, this zero establishes a minimum switching frequency $f_{min}$ for which the output power of the converter is reduced to zero. In other words, the converter output voltage goes to zero when the switching frequency $f_o$ of the transistor bridge is reduced to the minimum frequency $f_{min}$. In the preferred embodiment, the impedance value of L1 is chosen so that the load independent zero has a frequency of approximately 50% of the dominant resonant frequency $f_{res}$ established by the tank elements.

Another four element mechanization, transformer-less as indicated above, is depicted in FIG. 8. In this mechanization, the tank circuit includes the boost inductor L3, but not the frequency limiting inductor L1. Without inductor L1, the lower limit of the converter operating frequency is not fixed, and under low load conditions, the performance improvements discussed attributable to capacitor C2 are not as pronounced. Nevertheless, the converter circuit of FIG. 8 demonstrates that this invention is not limited to the use of an isolation transformer T1, or an inductor L1 in parallel with the tank capacitor C1.

With the exception of the operation of the specific tank circuits, the functioning of the converters depicted in FIGS. 6–8 is simple and well known to those skilled in the art. Transistors Q1–Q4 are switched on and off in pairs so as to produce quasi-square waves with peak-to-peak voltages essentially equal to that of the instantaneous voltage across the output of CR1, and at a frequency lower than the dominant resonant frequency $f_{res}$ of the tank, defined primarily by the impedance values of capacitor C1 and inductor L2. Since the capacitor C2 and inductor L3 are coupled in parallel with the load circuit, their influence on the frequency of the dominant pole varies with load. According to this invention, the switching frequency $f_o$ of the bridge transistors Q1–Q4 is controlled to maintain a desired output power, but is limited to maximum frequency $f_{max}$ of approximately 60% of the dominant resonant frequency $f_{res}$. At switching frequencies below this maximum, the output power varies proportionally and monotonically with the switching frequency. In mechanizations including the inductor L1 connected in parallel with capacitor C1, the frequency range is therefore limited to between 50% and 60% of the dominant resonant frequency $f_{res}$.

Since the converters operate in a sub-resonant mode (that is, their switching frequency $f_o$ is lower than the dominant resonant frequency $f_{res}$), the tank current flows through a conducting pair of IGBTs in a positive portion of its cycle, and then reverses through the anti-parallel diodes of the same IGBTS. After the current reverses, the IGBTs are turned off as described above so as to achieve zero-current or soft switching. When the other pair of IGBTs are turned on, any residual reverse current, plus the reverse recovery current of the anti-parallel diodes, is shunted through the IGBTs resulting in an undesirable surge of current therethrough.

Figure 9A:
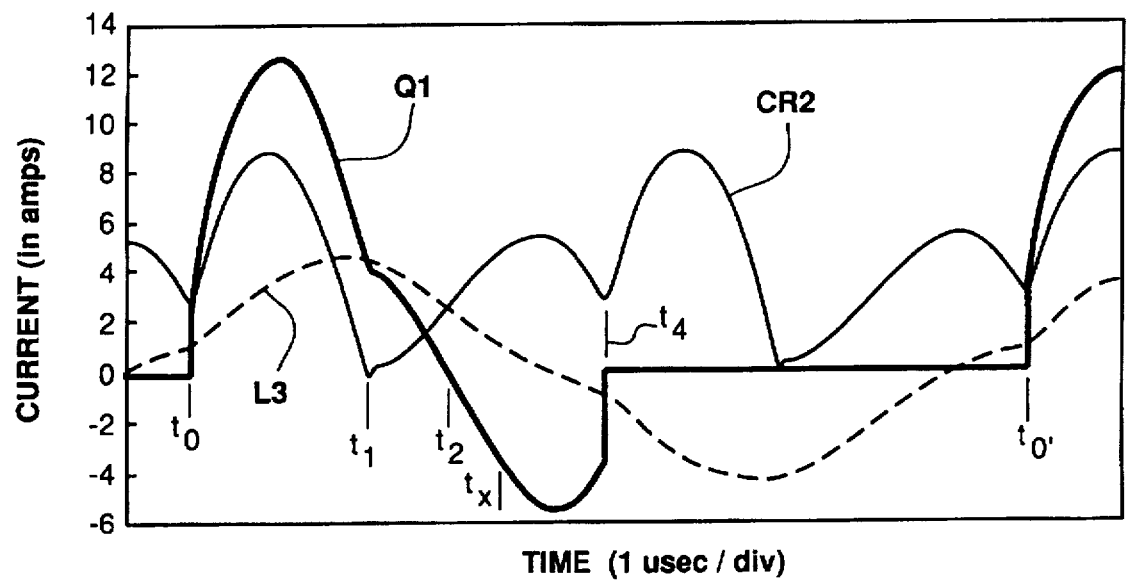
FIG. 9A is a graph depicting typical current waveforms in a converter circuit like that depicted in FIG. 7, but with the first capacitor removed.
Figure 10A:
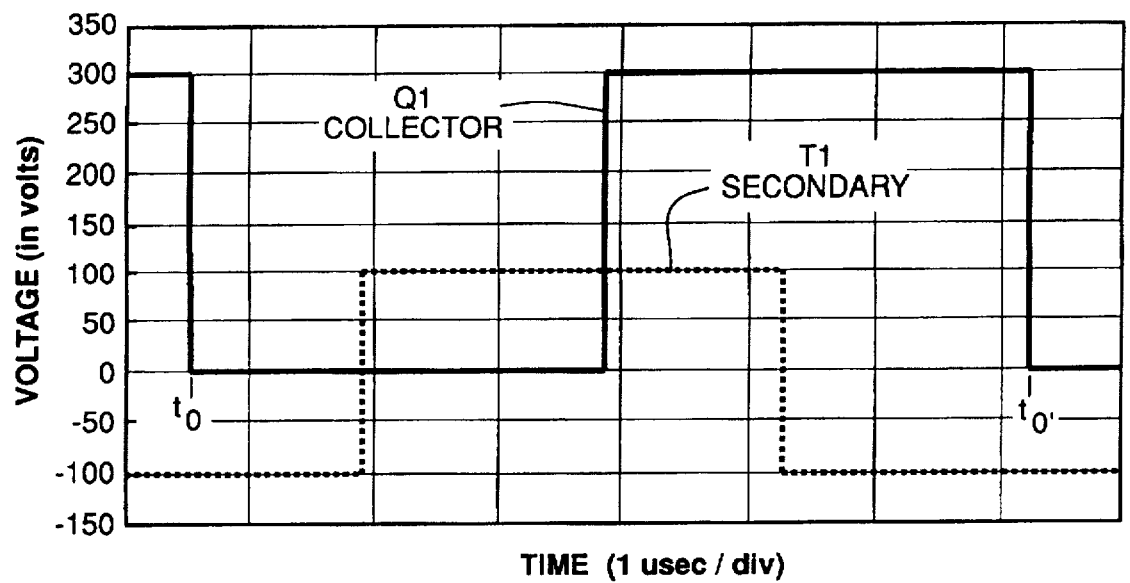
FIG. 10A is a graph depicting typical voltage waveforms in a converter circuit like that depicted in FIG. 7, but with the first capacitor removed.

The above-described operation is graphically depicted in FIGS. 9A and 10A, which respectively set forth current and voltage waveforms as a function of time for a converter circuit such as depicted in FIG. 7, but with the capacitor C2 removed. Referring to FIG. 9A, the time $t_0$ designates the turn-on of a given pair of IGBTs such as Q1 and Q4, marking the beginning of a switching cycle. The other pair of IGBTs (Q2 and Q3) are biased on at time $t_4$, and the cycle is repeated at time $t_0'$ when the IGBTs Q1 and Q4 are biased on. The heavy solid trace designated $I_{Q1}$ shows the current supplied by the IGBT Q1. The solid trace $I_{L3}$ shows the current shunted through inductor L3, and the broken trace $I_{CR2}$ shows the rectified output or load current at the output of bridge rectifier CR2. In FIG. 10A, the solid trace designated as $V_{Q1}$ represents the voltage across IGBT Q1, and the broken trace designated as $V_{T1}$ represents the voltage across the secondary winding S of the isolation transformer T1.

$I_{Q1}$ can be viewed as the sum of $I_{L3}$ and $I_{CR2}$. As seen, the positive portion of the supplied current $I_{Q1}$ occurring in the interval $t_0$–$t_2$ is somewhat distorted due to the operation of boost inductor L3. This has the effect, as indicated above, of increasing the form factor of the tank current above a optimum value. At time $t_1$, the voltage across the secondary winding S of transformer T1 reverses as seen in FIG. 10A, changing the current path through the output bridge CR2. The negative portion of the tank current $I_{Q1}$ occurs in the interval $t_2$-$t_4$, and it is during this interval that the IGBTs Q1 and Q4 are turned-off at time $t_x$. The termination of the negative current at time $t_4$ is due to the turn-on of IGBTs Q2 and Q3. A similar tank current waveform, but of opposite polarity, occurs in the interval $t_4$-$t_0'$.

As pertains to the present invention, it is important to note that the turn on of each pair of IGBTs occurs while a substantial reverse current is still flowing through the anti-parallel diodes of the other pair of IGBTs. This accounts for the sharp increase in $I_{Q1}$ seen at times $t_0$ and $t_0'$. Of course, a similar increase occurs (although not shown in FIG. 9A) at time $t_4$ when transistors Q2 and Q3 are turned-on. In each instance, the converter suffers from associated switching losses, and produces undesirably high amounts of EMI. An additional source of EMI is the sharp dv/dt across the transformer T1 at time $t_1$, seen in FIG. 10A.

Figure 9B:
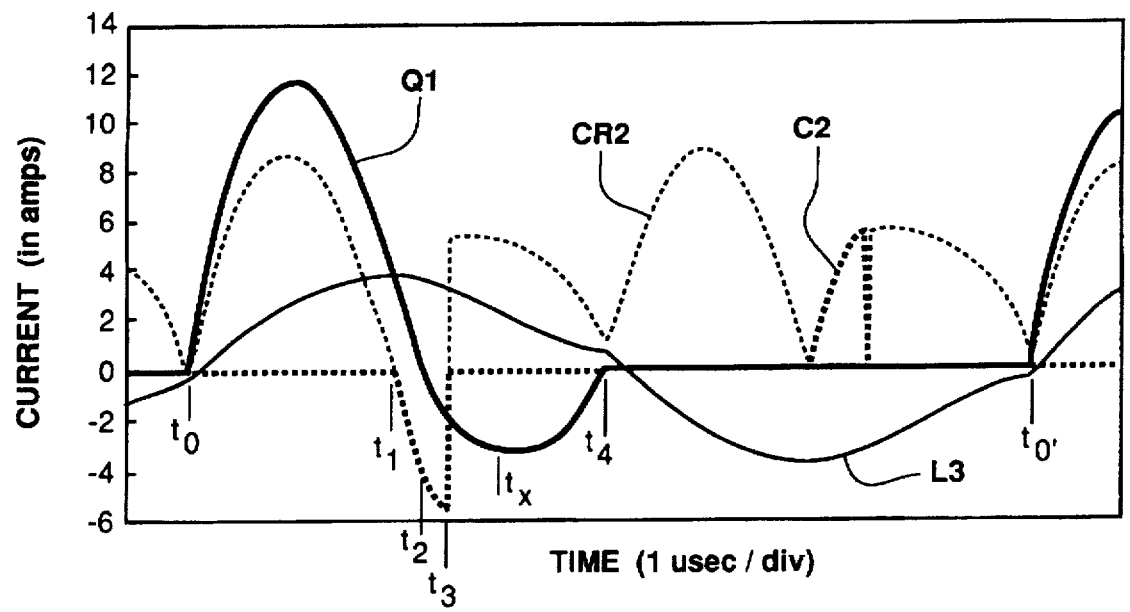
FIG. 9B is a graph depicting typical current waveforms in the five-element converter circuit of FIG. 7.
Figure 10B:
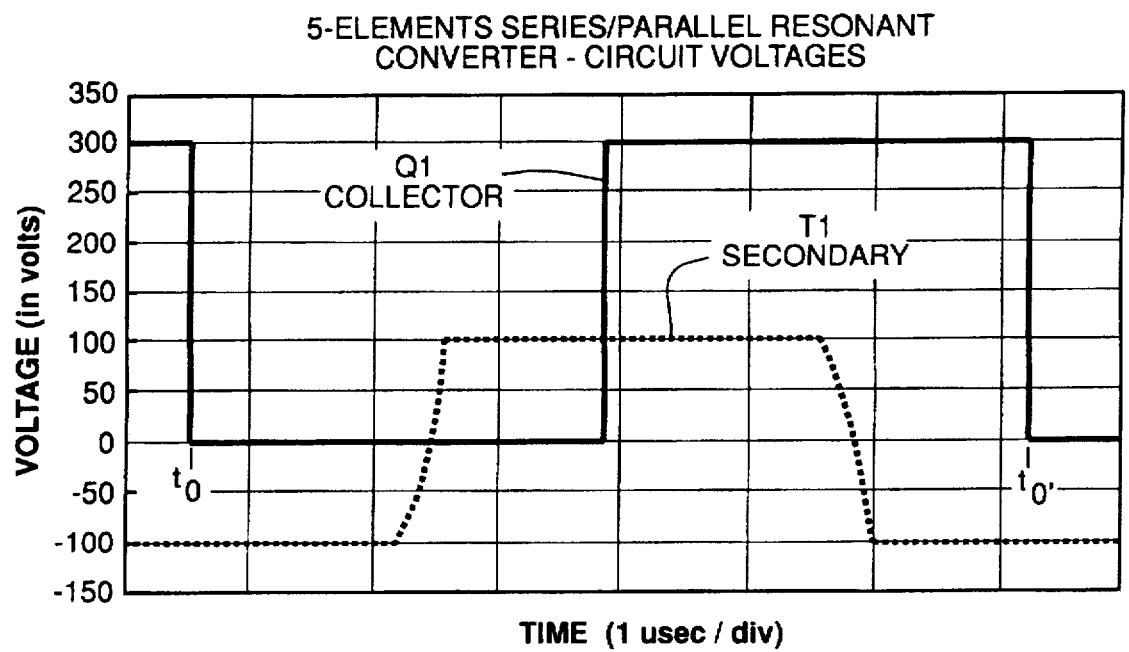
FIG. 10B is a graph depicting typical voltage in the five-element converter of FIG. 7.

FIGS. 9B and 10B show corresponding current and voltage waveforms for the converter of FIG. 7. Except for the addition of a waveform $I_{C2}$ showing the current through the tank capacitor C2, the waveforms and time designations of FIG. 9B correspond to those shown in FIG. 9A. As demonstrated by the waveforms, the addition of the load coupled capacitor C2 according to this invention substantially eliminates the undesirable operating characteristics described in reference to FIGS. 9A–10A. The reversal in output voltage now occurs significantly more slowly, as seen in FIG. 10B. This in itself reduces EMI, but more importantly, it results in a capacitor current $I_{C2}$ in the dv/dt interval of $t_1$-$t_3$ that changes the waveform of the supplied current $I_{Q1}$ in a manner to reduce its form factor while shortening the reverse current interval $t_2$-$t_4$.

Reducing the form factor is particularly advantageous in converters incorporating an inductor L3 for boost capability, since as indicated above, the inclusion of inductor L3 has the undesirable effect of increasing the form factor of the tank current above the optimum value. Reducing the form factor closer to the optimum value has the effect of reducing conduction losses and improving operating efficiency. In the mechanization of FIG. 7, a form factor improvement of approximately 18% was achieved.

By shortening the duration of the negative cycle of the supplied current, the reverse current through the anti-parallel diode of the current pair of switching devices is terminated, or nearly so, by the turn on of the next pair of switching devices. In the example of FIG. 9B, only a small amount of reverse current remains at time $t_4$ when IGBTs Q2 and Q3 are turned-on. As a result, the current surge at the turn-on of each pair of IGBTs is substantially reduced. This, in turn, has the effect of reducing switching losses and the EMI associated with the rapid initial rise in current at turn on.

FIG. 11 is a table showing frequency breakpoints and the relative component values of the tank components for frequency ranges of 1:1000 (or greater), 1:2, 1:1.5 and for 1:1.2. The frequency range of 1:1000 (or greater) corresponds to the circuit of FIG. 7 with the inductor L1 removed, while the other frequency ranges correspond to the circuit of FIG. 7 as shown. The assumption made in this table is that the transformer has a 1:1 turns ratio. The Vin/Vout ratio for AC input mechanizations is given in Vrms/Vdc. Rload (effective) is calculated as Vout/Iload at rated output. The frequency breakpoints are given in relationship to the operating frequency at full output, Fo(max). The impedance values of the five-element components are given in relationship to R and at Fo(max).

Figure 12:
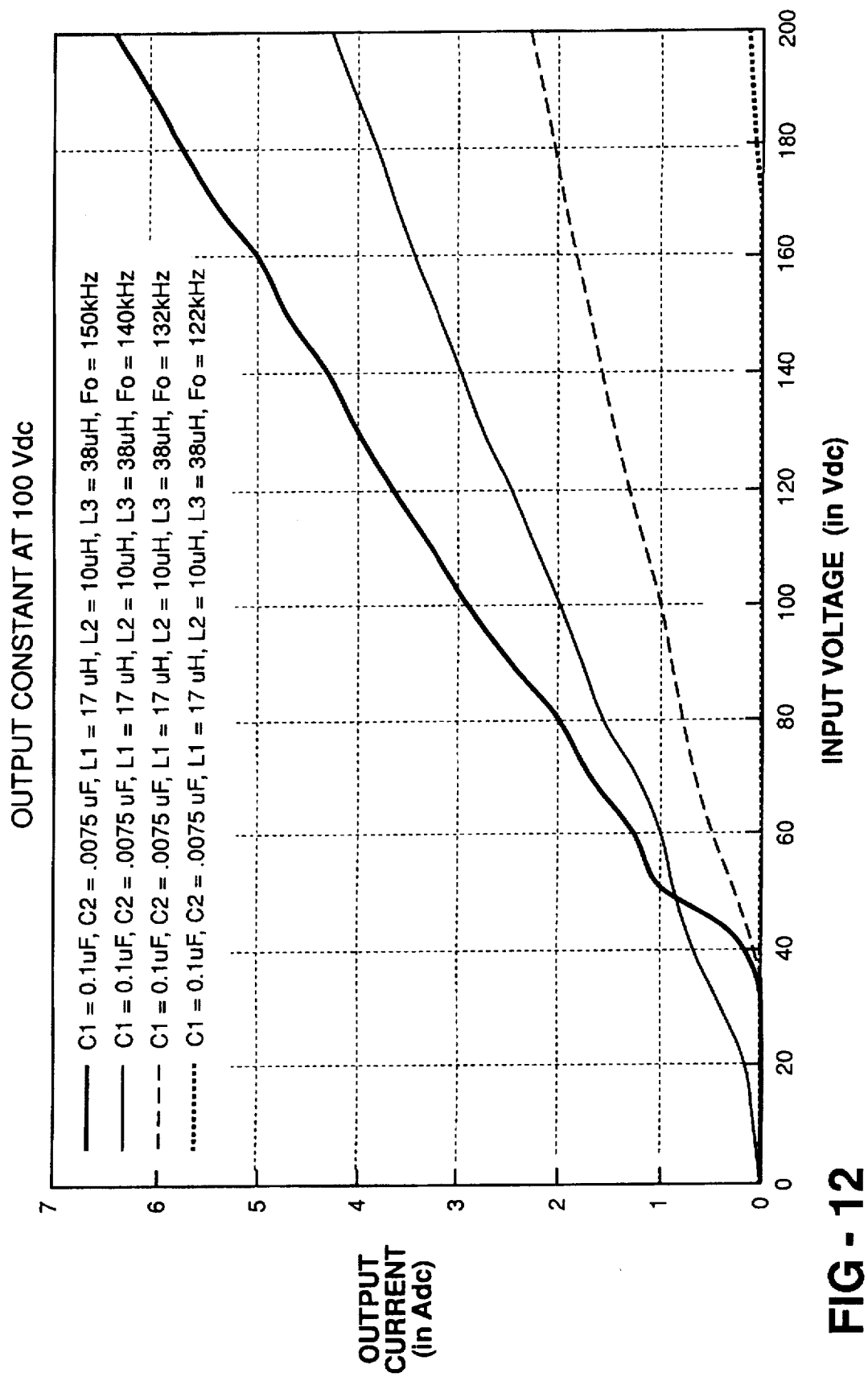
FIG. 12 is a graph depicting DC load current as a function of input voltage for the converter circuit of FIG. 7 at four different operating frequencies.

FIG. 12 shows the power transfer characteristics of the five-element resonant converter of FIG. 7 at four different operating frequencies ($F_o$), using the example component values given in the right-most column of the chart of FIG. 11. As shown, the maximum power output occurs at an operating frequency of 150 kHz, and decreases monotonically to zero as the operating frequency is reduced to the minimum operating frequency of 125 kHz, defined by the parallel combination of inductor L1 and capacitor C1.

In summary, the present invention provides a novel sub-resonant converter topology which retains the advantages generally associated with simple series resonant converters while improving the form factor of the conducted current and reducing the EMI produced by the converter. The invention has been described in reference to the various embodiments, and it should be understood that many other variations within the scope of this invention are also possible. Thus, the scope of this invention is not limited to the illustrated embodiments, but rather, is defined by the appended claims.

The embodiments of the invention in which an exclusive property or privilege in claimed are defined as follows:

1. A resonant converter for supplying current to a load circuit from a uni-polar source, including a resonant tank circuit coupled to said load circuit and comprising resonant tank elements defining a dominant resonant frequency of said tank circuit, and a bridge inverter circuit including alternately activated switching devices for supplying current from the source to the tank circuit, the improvement wherein:

the switching devices of the bridge inverter circuit are activated at a switching frequency below said dominant resonant frequency of said tank circuit so that the current in said tank circuit includes a positive interval during which current is supplied to the tank circuit through an activated switching device followed by a negative interval during which the current in the tank circuit reverses through an anti-parallel diode shunting said activated switching device; and said resonant tank elements include a tank inductor and tank capacitor connected in series, an additional capacitor connected in series with said tank capacitor and tank inductor, a boost inductor connected in parallel with said additional capacitor, the load also being connected in parallel with said additional capacitor, said additional capacitor operating to reduce the form factor of the current in said tank circuit while shortening said negative interval of such current so that the tank circuit current flowing in an anti-parallel diode shunting a given switching device is terminated, or nearly so, when the other switching device is activated.

2. The resonant converter of claim 1, including:

an isolation transformer having a primary winding connected in parallel with said boost inductor and a secondary winding connected in parallel with said additional capacitor.

3. The resonant converter of claim 1, wherein the switching frequency of said switching devices is limited to a maximum value, and said boost inductor and additional capacitor form a load zero having a resonant frequency of about twice said maximum value.

4. The resonant converter of claim 1, wherein said resonant tank elements include an additional inductor connected in parallel with said tank capacitor, said additional inductor and tank capacitor defining a resonant zero at a frequency below said dominant resonant frequency, thereby defining a minimum switching frequency for said bridge inverter circuit.

5. The resonant converter of claim 1, wherein said load circuit includes a storage battery and a full-wave bridge rectifier for supplying DC current to said storage battery.

6. The resonant converter of claim 1, wherein said uni-polar source comprises a source of alternating current and a full-wave bridge rectifier.

7. A resonant converter for supplying current to a load circuit from a uni-polar source, including a resonant tank circuit coupled to said load circuit and comprising resonant tank elements defining a dominant resonant frequency of said tank circuit, and a bridge inverter circuit including alternately activated switching devices for supplying current from the source to the tank circuit, the improvement wherein:

the switching devices of the bridge inverter circuit are activated at a switching frequency below said dominant resonant frequency of said tank circuit so that the current in said tank circuit includes a positive interval during which current is supplied to the tank circuit through an activated switching device followed by a negative interval during which the current in the tank circuit reverses through an anti-parallel diode shunting said activated switching device; and said resonant tank elements include a tank inductor and tank capacitor connected in series, a second capacitor and second inductor connected in parallel with each other and in series with said tank inductor and tank capacitor, the load being connected in parallel with said second capacitor and second inductor, said second capacitor operating to reduce the form factor of the current in said tank circuit while shortening said negative interval of such current so that the tank circuit current flowing in an anti-parallel diode shunting a given switching device is terminated, or nearly so, when the other switching device is activated.

8. The resonant converter set forth in claim 7, wherein said resonant tank elements include a third inductor connected in parallel with said tank capacitor, said third inductor and tank capacitor defining a resonant zero at a frequency below said dominant resonant frequency, thereby defining a minimum switching frequency for said bridge inverter circuit.

9. The resonant converter of claim 8, wherein the switching frequency is permitted to vary between said minimum switching frequency and a maximum switching frequency which is higher than said minimum switching frequency but lower than said dominant resonant frequency of said tank circuit.

10. The resonant converter of claim 7, wherein the switching frequency of said switching devices is limited to a maximum value, and said second inductor and second capacitor form a load zero having a resonant frequency of about twice said maximum value.

* * * * *